United States Patent [19]
Tseng

[11] Patent Number: 5,815,329
[45] Date of Patent: Sep. 29, 1998

[54] TRI-MIRROR MULTI-REFLECTION OPTICAL PATH FOLDING APPARATUS

[75] Inventor: Wen-Tso Tseng, Tai Chung, Taiwan

[73] Assignee: Umax Data Systems, Inc., Hsinchu, Taiwan

[21] Appl. No.: 712,588

[22] Filed: Sep. 13, 1996

[51] Int. Cl.⁶ .............................. G02B 5/08; G02B 17/00
[52] U.S. Cl. .................... 359/861; 359/726; 359/850; 359/857
[58] Field of Search ................................. 359/726, 850, 359/857, 861

[56] References Cited

U.S. PATENT DOCUMENTS

| 3,205,776 | 9/1965 | Wright et al. | 359/861 |
| 3,806,222 | 4/1974 | Knappe | 359/861 |
| 4,174,154 | 11/1979 | Kawasaki | 359/861 |
| 4,962,980 | 10/1990 | Knowles | 359/861 |
| 5,027,424 | 6/1991 | Yamazaki et al. | 359/861 |
| 5,619,346 | 4/1997 | Powers | 359/861 |
| 5,631,770 | 5/1997 | Jarmuz | 359/861 |

*Primary Examiner*—Georgia Y. Epps
*Assistant Examiner*—Evelyn A. Lester
*Attorney, Agent, or Firm*—W. Wayne Liauh

[57] ABSTRACT

A tri-mirror multi-reflection optical path folding apparatus for optical scanner includes a light source, a reflection means, a lens set, a charged coupled device (CCD), and a base. The three reflection mirrors of the reflection means are positioned with each other at selected angles such that total reflection time of the optical path is four or five times. The optical path folding apparatus, consequently the scanner, can be made compact size, light weight and low cost.

9 Claims, 5 Drawing Sheets

TRI-MIRROR MULTI-REFLECTION OPTICAL PATH FOLDING APPARATUS

BACKGROUND OF THE INVENTION

1. Field of the Invention

The invention relates to a tri-mirror multi-reflection optical path folding apparatus and particularly to a optical path folding apparatus having three reflecting mirrors for use in optical scanner.

2. Description of the Prior Art

Optical scanner employs a principle of using a optical path folding apparatus to reflect light to a lens set for forming a light image, then using a charged coupled device (CCD) to convert the light image to digital signal for computer storing and processing. Optically, it needs a certain length of optical path to form a light image. Therefore a conventional optical path folding apparatus usually includes a plural number of reflection mirrors for folding optical path to obtain an apparatus of compact size. The number, size and relative positions of these reflection mirrors directly affect the size and weight of the optical path folding apparatus, and indirectly affect the size and weight of a scanner.

Conventional optical scanner usually has four pieces of reflection mirrors each reflects light rays once thereupon before focusing and reaching a CCD. Such structure is large-sized, heavy-weighted and high-costed. In an era which demands the electronic products be compact and light-weighted, there is still a room for improvement in the optical scanner.

Taiwan (R.O.C.) patent application number 79207828 discloses an optical path folding apparatus for optical scanner which uses three pieces of reflection mirrors. There are four total light reflections with two light reflections taking place on the first reflection mirror. While it can reduce somewhat the size and weight of the optical path folding apparatus, the two reflections on the first mirror do not fall on the same spot. Therefore the size of the first mirror has to be increased which undercuts the overall size and weight shrinking effects.

SUMMARY OF THE INVENTION

It is an object of this present invention to provide a tri-mirror multi-reflection optical path folding apparatus for optical scanner. The optical path folding apparatus according to the present invention includes three reflection mirrors which are singularly positioned so that at least one of the mirrors has two light reflections taking place thereupon at a same spot. Oily the light incident angles are different on this mirror. Therefore the weight, size and cost of the optical path folding apparatus can be reduced.

It is another object of the present invention to provide all tri-mirror multi-reflection optical path folding apparatuses which offer the optimal optical pathes with total refection times of four or five.

DETAILED DESCRIPTION

Figure 1:
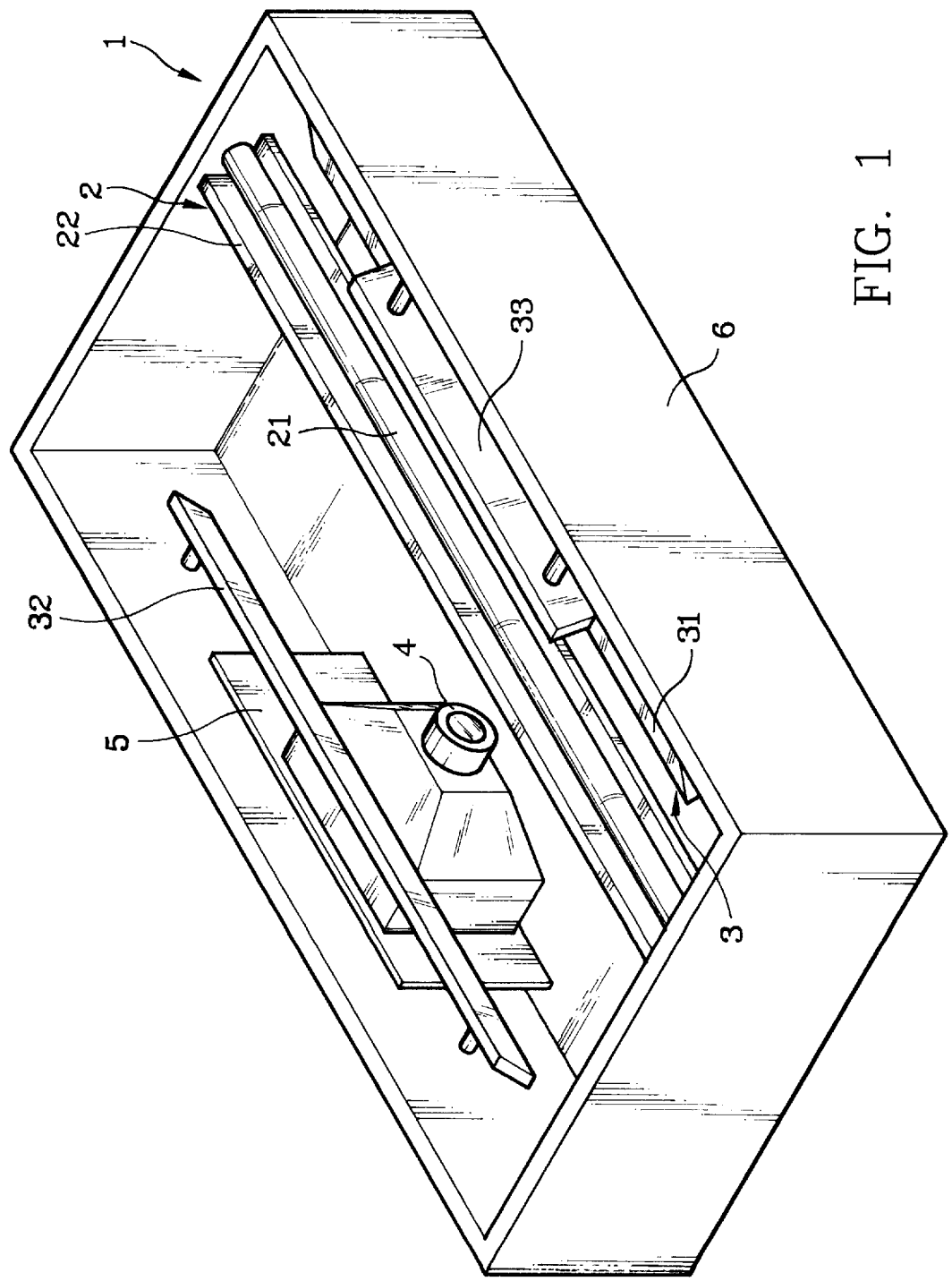
FIG. 1 is a perspective view of an embodiment, partial, of the present invention.
Figure 2:
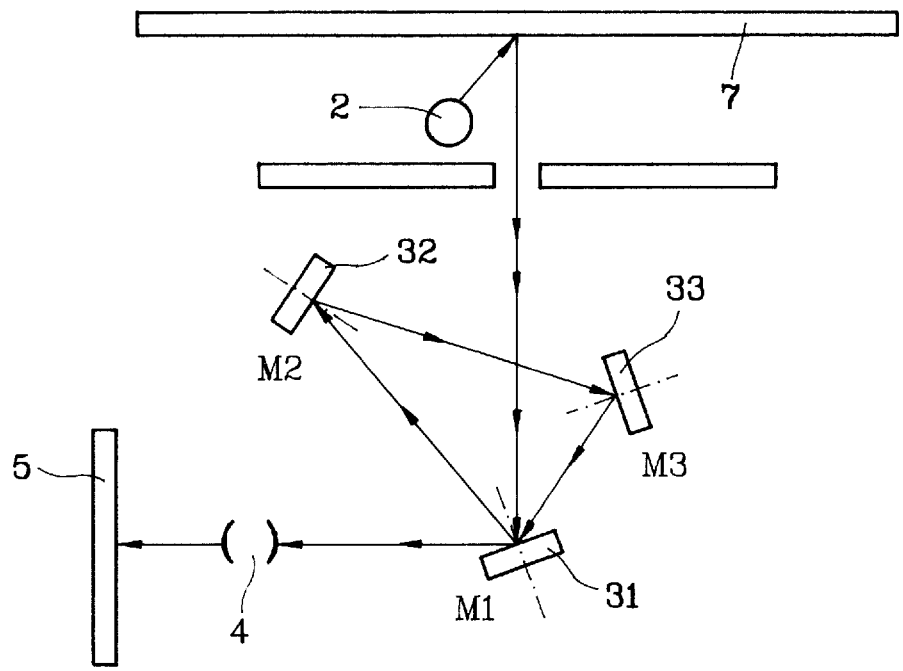
FIG. 2 is a schematic diagram of the present invention.

Referring to FIGS. 1 and 2, the optical path folding apparatus 1 of the present invention includes a light source 2, a tri-mirror reflection means 3, a lens set 4, a charged coupled device (CCD) 5 and a base 6 for holding all of aforesaid elements. The light source 2 includes a lamp tube 21 and a lamp holder 22 for providing light needed to form light image. The tri-mirror reflection means 3 includes a first reflection mirror 31, a second reflection mirror 32 and a third reflection mirror 33 that can reflect light from the light source for four or five times before reaching the lens set 4. The lens set 4 forms a light image on the CCD 5 which converts it into digital signals for computer storing and processing. The reflection mirrors 31, 32 and 33 are so positioned with each other that at least one of them will receive and reflect light a plural number of times at the same spot at different angles. Thus a good light reflection result can be obtained while the weight and size of the optical path folding apparatus can be reduced. The structure of the light source 2, the lens set 4 and the CCD 5 are similar to the conventional scanner and forms no part of the present invention, and thus is omitted here.

FIG. 2 illustrates a detailed scheme of the present invention. The light source 2 emits light upon a scanned object 7 (a document or photo). The reflected light then projects into the tri-mirror reflection means 3. The reflected light first reaches the first reflection mirror 31 at a small angle. The image light then travels to the second reflection mirror 32 and the third reflection mirror 33, and to the first mirror 31 again at the same spot but at a larger incident angle. The light rays, after leaving the first mirror 31 for the second time, project upon the lens set 4 which forms a light image on the CCD 5.

If the three reflection mirrors 31, 32 and 33 to be designated respectively as M1, M2 and M3, the total optical path is: the light source→M1→M2→M3→M1→the lens set. There are total four reflections. M1 receives two incident light at the same spot but at different angles. The size of mirror M1 may be made small. The overall size and weight of the optical path folding apparatus thus can be made in compact size and light weight while still get good reflection result.

Figure 3:
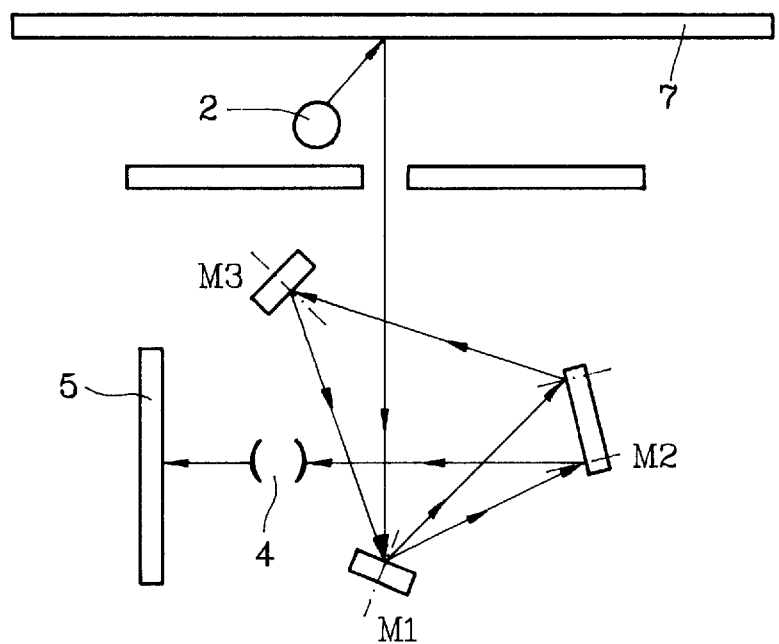
FIG. 3 to FIG. 9 are schematic diagrams of the other embodiments of the present invention.

FIG. 3 illustrates another embodiment of the present invention. The light path is: the light source→M1→M2→M3→M1→M2→the lens set. As the total length of the optical path for forming an image is usually fixed in an optical scanner, the total size and weight may be further reduced with five times of light reflection in this embodiment.

Although in principle the total reflection times can be six or more, the image forming quality will be diminished resulting from poor resolution and decreasing light intensity. It is therefore not practical to have six reflections or more in an optical path folding apparatus.

Figure 4:
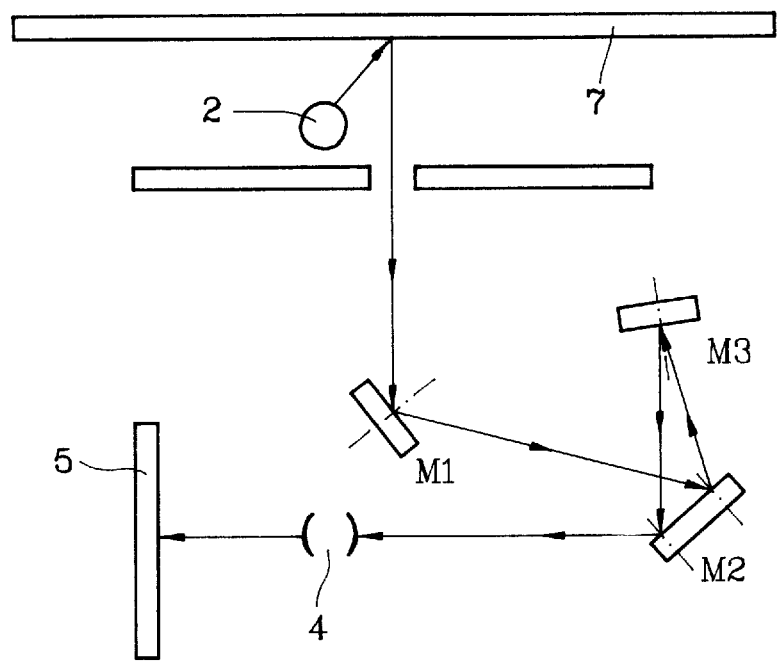

FIG. 4 shows a third embodiment of the present invention. The optical path is: the light source→M1→M2→M1→M2→the lens set. Total reflection time is four.

Figure 5:
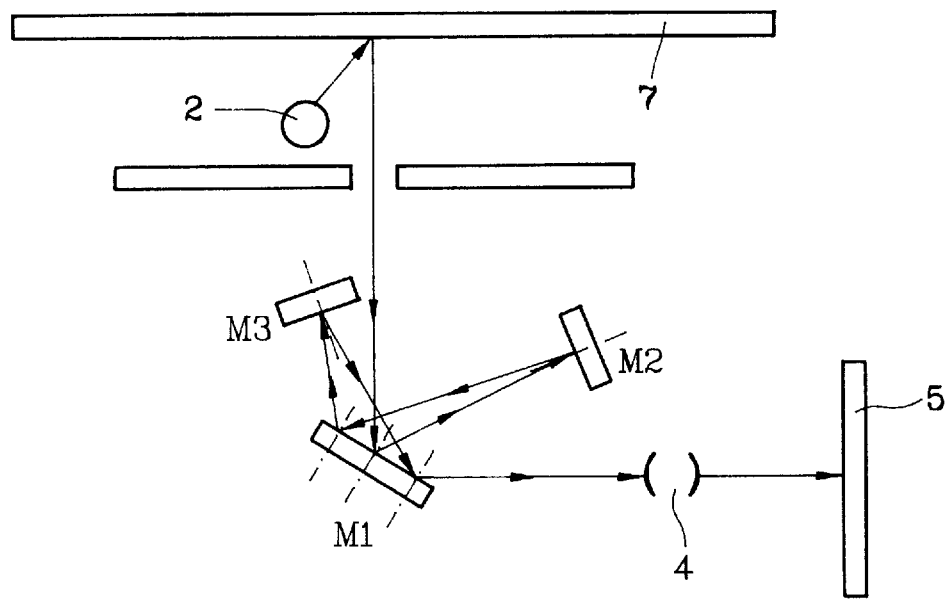

FIG. 5 shows a fourth embodiment of the present invention. The optical path is: the light source→M1→M2→M1→M3→M1→the lens set. Total reflection time is five.

Figure 6:
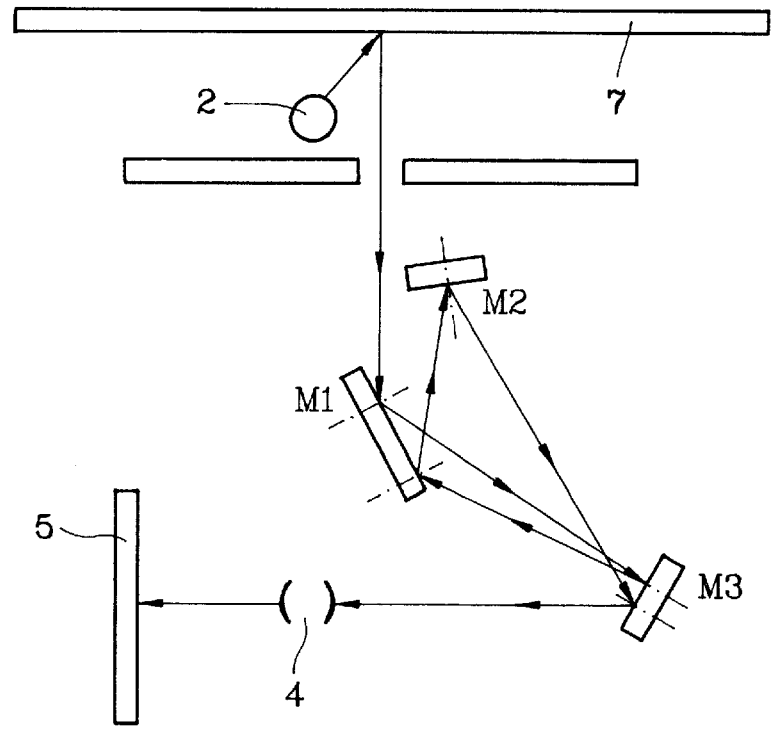

FIG. 6 is a fifth embodiment of the present invention. The optical path is: the light source M1→M3→M1→M2→M3→the lens set. Total reflection time is five.

Figure 7:
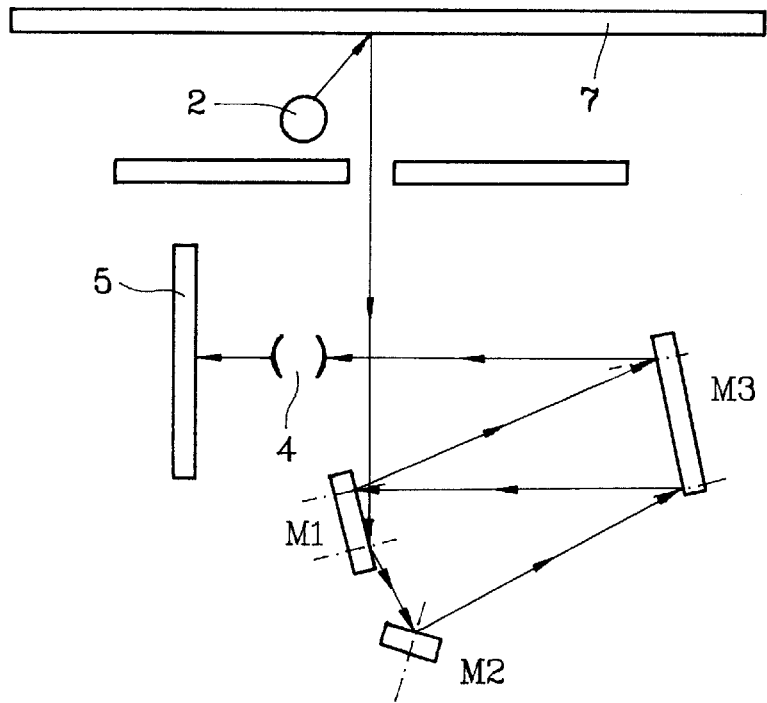
Figure 8:
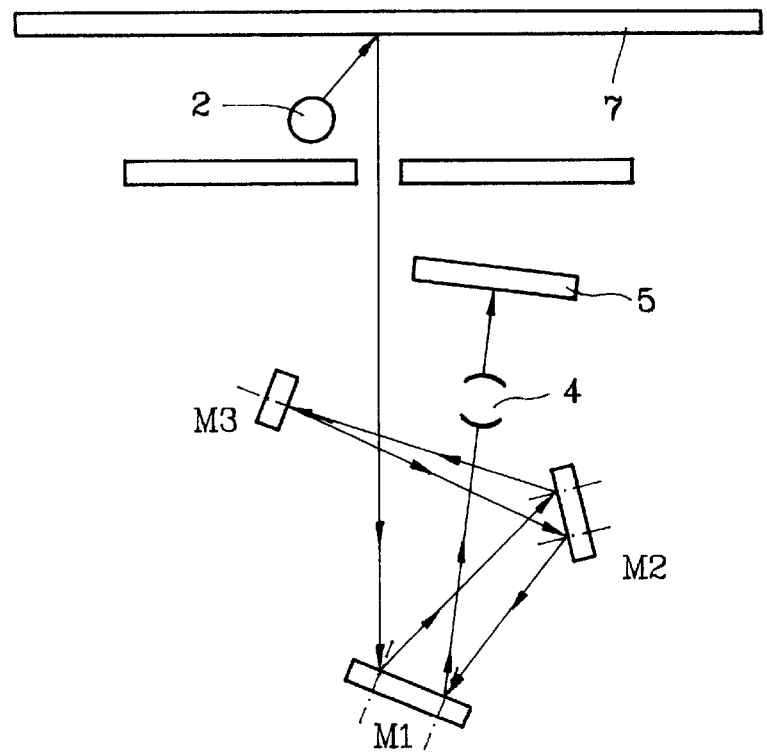

FIG. 7 illustrates a sixth embodiment of the present invention. The optical path is: the light source→M1→M2→M3→M1→M3→the lens set. Total reflection time is five FIG. 8 shows a seven embodiment of the present invention. The optical path is: the light source→M1→M2→M3→M2→M1→the lens set. Total reflection time is five.

Figure 9:
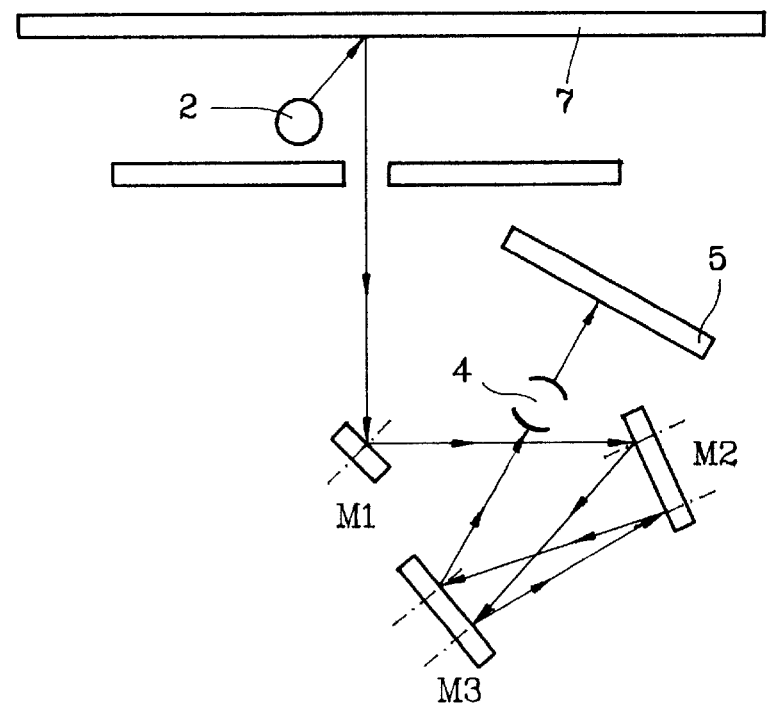

FIG. 9 is the eighth embodiment of the present invention. The optical path is: the light source→M1→M2→M3→M2→M1→the lens set. Total reflection time is five.

What is claimed is:

1. A tri-mirror multi-reflection optical path folding apparatus for optical scanner comprising:

a light source for providing light to a scanned object;

a reflection means including a first reflection mirror M1, a second reflection mirror M2, and a third reflection mirror M3 for reflecting the light to a desired direction;

a lens set for converging the light coming from the reflection means into a light image;

a charged coupled device for converting the light image to digital signals for computer storing and processing; and a base for holding all aforesaid elements; wherein the mirrors M1, M2 and M3 are so positioned that at least one of the mirrors thereof reflects light two times and total reflection times of an optical path originating from the light source is four or five times but does not include the light path of the light source→M1→M2→M1→→M3→the lens set.

2. An optical path folding apparatus of claim 1, wherein the optical path is: the light source→M1→M2→M3 M1→the lens set.

3. An optical path folding apparatus of claim 1, wherein the optical path is: the light source→M1→M2→M3→M1→M2→the lens set.

4. An optical path folding apparatus of claim 1, wherein the optical path is: the light source→M→M2→M3→M2→the lens set.

5. An optical path folding apparatus of claim 1, wherein the optical path is: the light source→M1→M2→M1→M3→M1→the lens set.

6. An optical path folding apparatus of claim 1, wherein the optical path is: the light source→M1→M3→M1→M2→M3→the lens set.

7. An optical path folding apparatus of claim 1, wherein the optical path is: the light source→M1→M2→M3 M1→M3→the lens set.

8. An optical path folding apparatus of claim 1, wherein the optical path is: the light source→M1→M2→M3→M2→M1→the lens set.

9. An optical path folding apparatus of claim 1, wherein the optical path is: the light source→M1→M2→M3 M2→M3→the lens set.

* * * * *